Aug. 19, 1941.   W. R. THOMPSON   2,252,821
MULTICOLORED LAMINATED RESIN PRODUCT
Filed Aug. 17, 1938
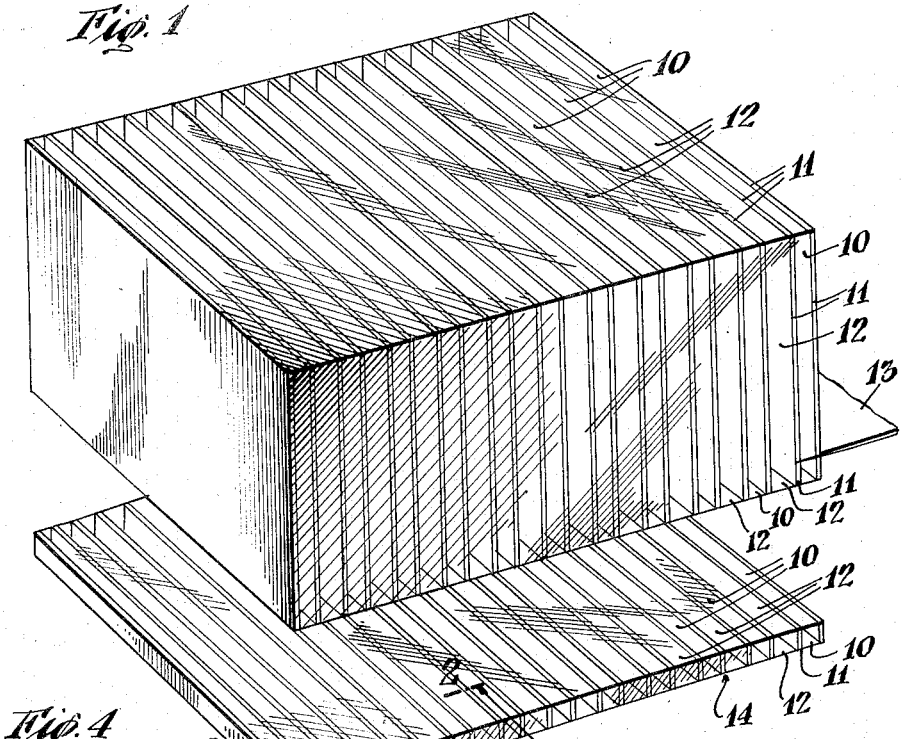
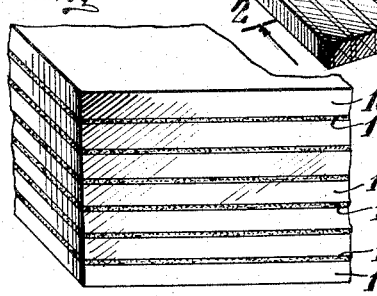
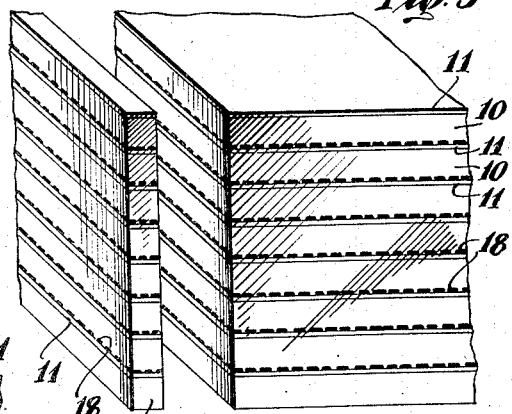
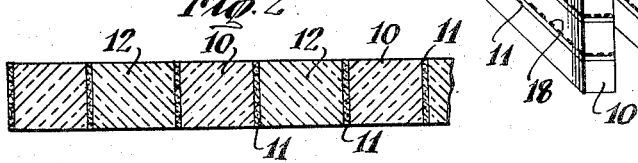
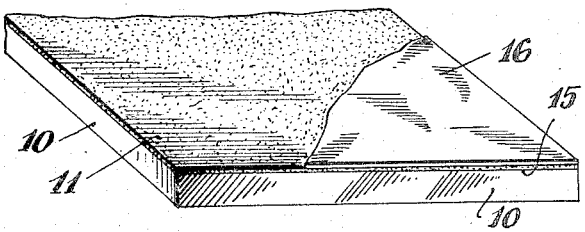
INVENTOR
Wesley R. Thompson
BY
Alan N. Mann
his ATTORNEY Patented Aug. 19, 1941

2,252,821

UNITED STATES PATENT OFFICE 2,252,821

MULTICOLORED LAMINATED RESIN PRODUCT

Wesley R. Thompson, Metuchen, N. J., assignor to Catalin Corporation of America, a corporation of Delaware Application August 17, 1938, Serial No. 225,280

2 Claims. (Cl. 154—43)

My invention relates to the manufacture of laminated color materials and more particularly to multicolored laminated resin materials suitable for making various decorative products.

Heretofore in the manufacture of colored resinous materials it has been the general practice to combine resin materials of various solid colors arranged to give the desired color effects, the individual resin pieces being of the same uniform color throughout each piece. For example, a piece of solid blue colored resin would be laminated with a piece of solid red resin, and so on, with other sheets of solid color. In this arrangement the only decorative effect obtained was the variation of solid colors.

I have discovered in accordance with my invention that new and unique decorative effects may be obtained and a highly useful resin product produced by surface coloring of the resin sheets, leaving the mass of the sheet transparent; laminating the surface colored sheets in the desired color arrangement to form a block of laminated material, and then cutting this block transversely or otherwise into strips or sheets. The result obtained by this procedure, as distinguished from the products produced heretofore, is a narrow color band effect in which the color bands have no appreciable thickness, that is, substantially the thickness of a line running through the material. Adjacent color bands are separated by the mass of the adjacent transparent resin sheets. In addition to the difference in decorative effect produced by these series of separated colored lines or bands, my product has a rather unique characteristic in that a large variation of colors may be obtained from a few basic colors, because of the different color effects produced from this material when it is subjected to the light at various angles, some of the light being transmitted and some reflected by the colored surfaces in the material. For example, when a laminated sheet of material is made up as above described in accordance with my invention and the surfaces of the several resin sheets are colored alternately with red and blue dye, and the laminated material is oriented at various angles in the light, a number of different colors and color combinations will be obtained including purple, violet, maroon, brown and yellow.

The laminated material having the line or band color effect described above may be produced, I have found, in a variety of ways, such as the following:

Sheets of cured, insoluble and infusible resin are surface dyed in different colors by application of organic dyes. These surface dyed sheets, their principal mass still being transparent, are set up in spaced arrangement and a transparent fusible resin deposited between the spaced sheets to form therebetween transparent fusible resin sheets, and then the resulting assembly heated to cure the fusible resin sheets and unite the assembly into a unitary block or mass. Sheets of the laminated material may then be obtained by slicing or cutting the block transversely, vertically or diagonally. The sheets thus produced will have the desired line color effect because of the dyed surface of the several colored sheets separated by the interposed transparent resin sheets.

Alternatively, the material of my invention may be formed by surface dyeing a number of the infusible resin sheets as described above, coating these sheets with a transparent liquid adhesive capable of adhesively binding the sheets together; superimposing the coated sheets and applying heat and pressure to unite the sheets into a unitary block which may be cut into strips or layers as described above. The adhesive used for uniting these sheets may be either of the cold or hot setting type. If a cold setting adhesive is used it will not be necessary to apply the above mentioned heat.

Another method of preparing the material consists in using transparent resin sheets, which have not been surface dyed, and instead of surface dyeing coating the several sheets with dyed transparent liquid adhesive; superimposing the coated sheets and then completing the above procedure.

Still a further method comprises forming the several sheets from a resin which will weld autogeneously such as for example, a urea-phenol-formaldehyde resin, surface dyeing some or all of the sheets of this resin; superimposing the surface dyed sheets and applying heat and pressure sufficient to cause the several sheets to automatically bind together. As indicated, this procedure eliminates the necessity of using any adhesive binding agent.

The resin material, which may be used for preparing the above mentioned types of resin sheets of my invention, may vary widely in its composition and method of manufacture. To obtain the color band effects described above, it is of course desirable to use initially transparent colorless resin material so that the color bands will stand out by contrast with the transparent body of the laminated sheets. I have found it advantageous to use as the initial resin material, a hydrophilic phenol-formaldehyde resin of the type disclosed in Ostersetzer Reissue Patent No. 19,708. This type of resin is particularly characterized by containing a high mol ratio of formaldehyde to phenol, that is, more than 1.5 mols of formaldehyde to each mol of phenol and preferably from 2 to 3 mols of formaldehyde to each mol of phenol; the manufacture of this resin being characterized by reacting the phenol and formaldehyde in the presence of an alkaline catalyst and subsequently neutralizing the resin with acid followed by partial dehydration but leaving in the resin an appreciable amount of water. Other suitable types of phenol formaldehyde or urea, vinyl or other transparent or translucent resins may be used.

The novel features of my invention are set forth with particularity in the appended claims, the invention itself, however, both as to organization and method of procedure will be more clearly understood from the following detailed description taken in conjunction with the accompanying drawing, in which Fig. 1 is an elevational perspective view of a block of my material containing surface dyed sheets separated by transparent sheets, and illustrating cutting of this material into sheets;

Fig. 2 is a sectional view taken along lines 2—2 of Fig. 1;

Fig. 3 is an elevational perspective view of one of the surface dyed resin sheets partially broken away to indicate the dyed surface and a protective coating therefor;

Fig. 4 is a perspective view illustrating the laminated material bonded together by dyed cement; and Fig. 5 is a perspective view of the laminated material, the several sheets of which are surface dyed and bonded together by transparent cement.

Referring now to the drawing, and at first to Fig. 1, the block of material comprises a plurality of infusible transparent resin sheets 10, the surfaces of which are dyed to the desired colors as indicated by the layers 11. It will be understood that these dyed layers or bands 11 are shown greatly magnified in this view for purposes of illustration, but that in the actual product the color bands are of negligible thickness, that is, substantially line thickness. In accordance with the above description it will also be understood that in this specific but non-limiting example the alternate undyed resin sheets 12 were initially deposited, between the infusible sheets 10, in a fusible form and by application of heat and pressure to the assembly these fusible resin sheets 12 changed into the infusible form and welded together the alternate dyed sheets of infusible resin 10.

One method of cutting or slicing the block of laminated color material shown in Fig. 1 is illustrated in that figure, diagrammatically, by the cutting means 13 indicated as passing through the block of material in a transverse plane thereby producing a sheet of the laminated material shown generally at 14.

In Fig. 2 the sectional view of a portion of the cut sheet of the material in Fig. 1 illustrates more clearly the several laminated transparent resin sheets 10 and 12 and the varied color bands 11. As above described these color bands 11 may be of any desired colors; only a few basic colors need be used to provide a multi-color effect since light partially transmitted and partially reflected by the color bands 11 will produce a variety of different colors. This novel and useful decorative effect is made possible principally by having the color bands of negligible thickness so that light can be actually transmitted, at least in part, from one resin sheet through the color band to and through the next resin sheet, etc.

The resin sheet illustrated in Fig. 3 comprises a sheet of the transparent infusible resin 10 and a dyed color surface 11. It will be noted that this dyed surface extends into the resin sheet for a slight distance, as indicated at 15. In this modification the surface color 11 is protected by a thin film of varnish or lacquer shown at 16. This protective coating 16 prevents the dye 11 from bleeding through into the adjacent sheet of transparent resin, such as the sheets 12 in Fig. 1. While this protective coating is desirable it is not essential provided certain precautions are taken in the laminating process. One method that I have found advantageous for dying the transparent phenol formaldehyde resin sheets comprises the following procedure: The infusible resin sheets are heated in a high boiling organic solvent solution of the dye, to a temperature of about 120° C. for about 3 to 5 minutes with agitation, or until the dye has permeated the outer surface of the resin sheets and effected a uniform surface color. This may be carried out in any suitable type container and a condenser used to recover any vaporized solvent. The dyed sheets are removed from the container and are immersed for a short time in cold water. To remove the traces of any free dye which may be absorbed on the resin surface, the articles are preferably washed in a warm solution of ethyl alcohol. After drying the finished dyed material, it may be polished lightly on a buff. The organic solvent solution may be composed of, for example, one part butyl alcohol and one part of gylcerine, by volume. The dye may be of any desired color, such as, red, yellow, green, blue, violet or black.

The dyes that may be used for dying the resin material include both acid and basic dyes. Examples of suitable acid dyes are the sodium salts of sulphonic acid and dyes containing phenol groups associated with nitro groups, such as the naphthaline green and para nitraniline class of dyes. The basic dyes are mostly salts of color bases with hydrochloric acid or zinc chloride, two examples of this class being auramine and methyl violet base. When the resin material used is an acid resin better fixation and penetration of the dye is obtained with a basic dyestuff. Likewise, if a basic resin is to be dyed, then it would be advisable to use colors having acid groups in order to obtain the best fixation. These are desirable but not essential procedures for dying the resin material.

In Fig. 4 the block of multi-colored laminated sheet material is made up of a number of transparent resin sheets 10 which may be of the hydrophilic phenol-formaldehyde type of resin described above, and coatings of dyed adhesive. On the surfaces of each of these sheets or on any lesser number of the sheets, as desired, is applied a coating of dyed adhesive for bonding the several sheets together as indicated at 17. This adhesive may be any suitable form of transparent adhesive and I found it advantageous to use a phenol-formaldehyde liquid resin of the same composition as the resin sheets but not dehydrated or cured to solid form. A liquid resin of the type disclosed in the above Ostersetzer Reissue Patent No. 19,708 is desirable. This liquid resin cement is dyed with any suitable dye such as one of the organic dyes mentioned above, and the colored liquid resin is applied to the surface of the resin sheets by spraying, brushing, dipping or other suitable means. After the dyed cement has been applied the sheets are then superimposed and heated under slight pressure for a suitable length of time to effect welding of the several sheets into a unitary mass. As an example, I have prepared satisfactory products of the above type using the Ostersetzer liquid resin as adhesive, by heating the assembly to a temperature of about 80° C. for a period of about 48 hours under a pressure of about 200 pounds per square inch. It will be understood, however, that these conditions may be varied widely. For example, if a hot setting liquid resin of short curing time is used, instead of the above mentioned Ostersetzer resin, then the setting or laminating time would be reduced to about 30 minutes.

In the modification shown in Fig. 5 the resin sheets are surface dyed and bonded together with an undyed transparent cement. The several resin sheets 10 have their surfaces dyed a suitable color as indicated at 11. These surface dyed sheets may be of the same type as the surface dyed sheets 10, shown in Fig. 1. These sheets are superimposed and between adjacent sheets is spread a thin coating of colorless transparent phenol formaldehyde resin cement as indicated at 18. The single sheet or slice of laminated material shown at the left in Fig. 5 illustrates the form of material obtained by slicing the laminated block in a vertical direction. The material may be cut from the block at various other angles. While the material of my invention is of particular value for decorative purposes it is satisfactory for practically all of the general uses of manufactured resin materials. One of the important commercial uses of this material is for buttons on clothing. The material is not necessarily cut into sheets but may be cut or formed into rods in any other desired shapes.

Various modifications and changes may be made in the foregoing description without departing from the scope of my invention.

What is claimed is:

1. A laminated substantially transparent, rigid, flat body having unique decorative effects comprising a plurality of superimposed, transparent, hardened, surface dyed resin sheets combined together to form a substantially unitary body in which the dyed surfaces appear as narrow colored translucent bands of negligible thickness between contiguous sheets, said color bands having the property of transmitting light through said transparent body and partially reflecting the light to provide a variety of colors when the light is incident upon the bands at different angles, said variety of colors being greater in number than the basic colors of the dyed surfaces.

2. A laminated, substantially transparent, rigid flat body having unique decorative effects comprising a plurality of transparent hardened surface dyed resin sheets combined with a pluralit of interposed transparent resin sheets havin ; transparent and undyed surfaces to form a sub stantially unitary body in which the alternately positioned dyed surfaces appear as narrow colored translucent bands of negligible thickness between contiguous sheets, said color bands having the property of transmitting light through said transparent body and partially reflecting the light to provide a variety of colors when the light is incident upon the bands at different angles, said variety of colors being greater in number than the basic colors of the dyed surfaces.

WESLEY R. THOMPSON.